March 29, 1960

B. LANDEN 2,930,499

TRUCK HOIST

Filed Feb. 18, 1958

INVENTOR.
BERNARD LANDEN
BY *Rudolph L. Lowell*
ATTORNEY.

March 29, 1960
B. LANDEN
2,930,499
TRUCK HOIST
Filed Feb. 18, 1958
3 Sheets-Sheet 2
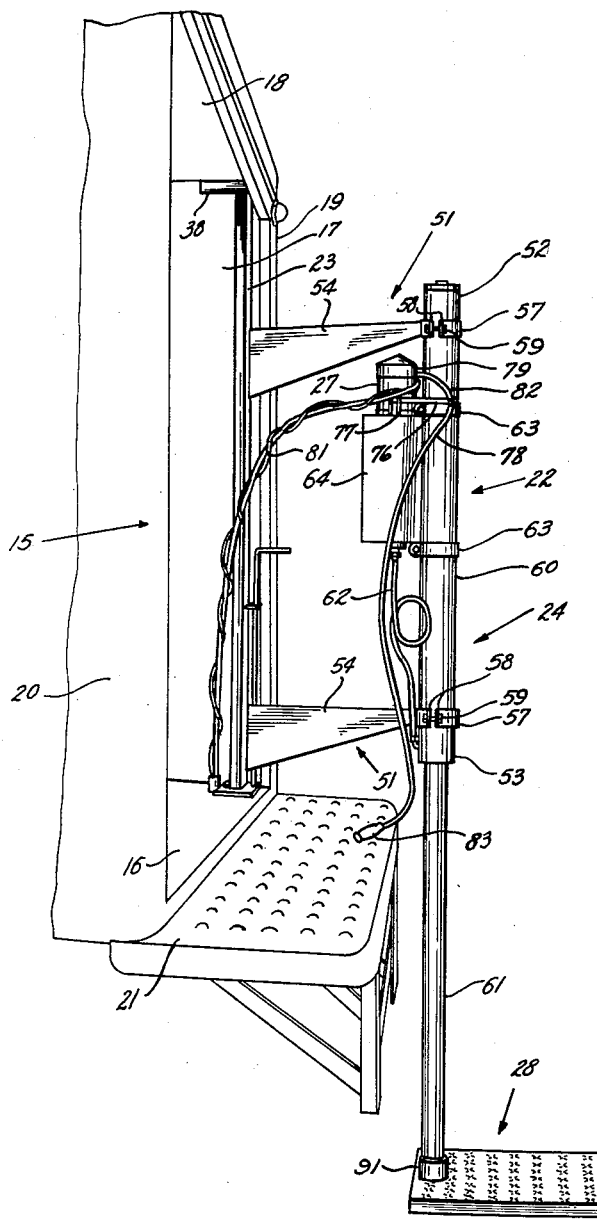
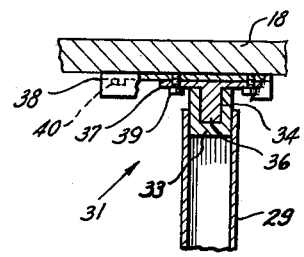
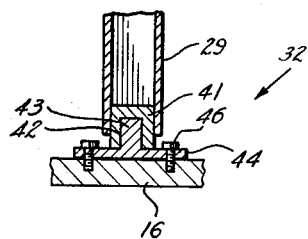
INVENTOR.
BERNARD LANDEN
BY
ATTORNEY.

March 29, 1960
B. LANDEN
2,930,499
TRUCK HOIST
Filed Feb. 18, 1958
3 Sheets-Sheet 3
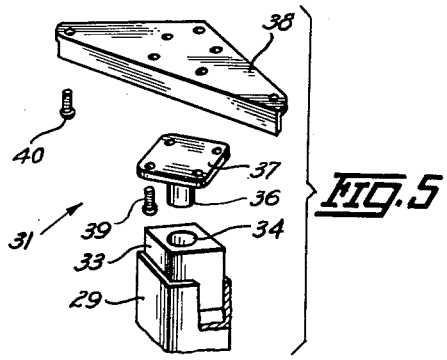
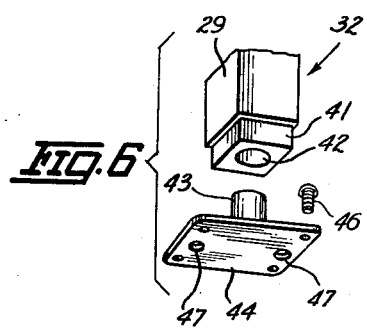
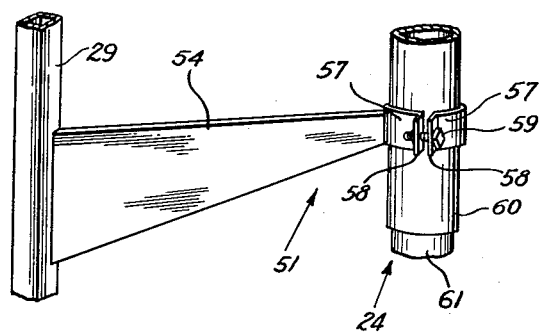
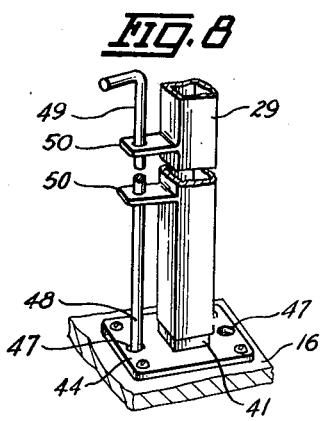
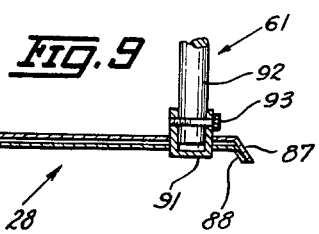
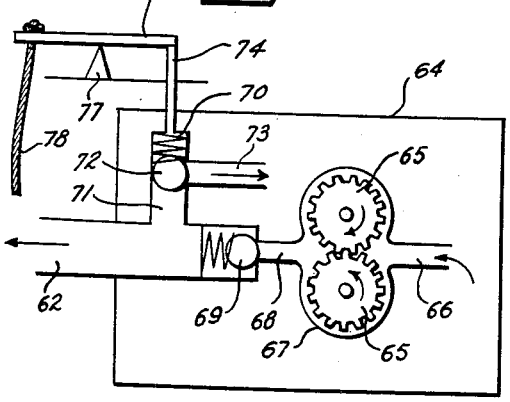
INVENTOR.
BERNARD LANDEN
BY Rudolph L. Lowell
ATTORNEY.

United States Patent Office 2,930,499
Patented Mar. 29, 1960

2,930,499

TRUCK HOIST

Bernard Landen, Ida Grove, Iowa

Application February 18, 1958, Serial No. 715,886

2 Claims. (Cl. 214—75)

This invention relates to hoist structures and particularly to a hoist and the mounting structure therefor permanently mounted in a moving van or the like for the loading and unloading of freight into and from the van.

An object of this invention is to provide a novel hoist assembly for the loading and unloading of freight into and from a moving van or the like.

Another object of this invention is to provide a hoist assembly mounted within a moving van or the like and capable of removing freight from within the van and then transferring the freight to the ground or on a loading platform at the rear of the van.

A further object of this invention is to provide a hoist assembly having a platform and mounted within a moving van or the like whereby the platform is vertically and horizontally movable both within and without the confines of the van box.

Yet a further object of this invention is to provide a hoist assembly mounted within the body or box of a moving van or the like for loading and unloading freight, the hoist assembly comprising vertically disposed structure adapted to be mounted closely adjacent a side wall of the box and horizontally disposed platform structure adapted to rest upon the floor of the box, whereby to save pay load space during transport.

A feature of this invention is to provide a hoist assembly including a supporting unit mounted in a van box for pivotal movement, a cylinder unit secured to the supporting unit, a horizontally disposed platform unit mounted for vertical movement to the cylinder unit, an electrically operated hydraulic pump unit for the cylinder unit, and controls for the units.

A further object of this invention is to provide a hoist assembly mounted in the box of a moving van or the like for loading and unloading purposes which is economical of manufacture, of a simple and rugged structure, and effective in service.

These and other objects and advantages will become apparent from the following description when taken in conjunction with the accompanying drawings in which:

Fig. 2 is a reduced fragmentary perspective similar to Fig. 1 but taken from another view point and showing the platform of the hoist in a lowered position;

Fig. 3 is an enlarged, fragmentary vertical sectional view taken along the line 3—3 in Fig. 1;

Fig. 4 is an enlarged, fragmentary vertical sectional view taken along the line 4—4 in Fig. 1;

Fig. 5 is an enlarged exploded view in perspective of the parts of Fig. 3;

Fig. 6 is an enlarged exploded view in perspective of the parts of Fig. 4;

Fig. 7 is an enlarged fragmentary perspective view of an area of Fig. 2;

Fig. 8 is an enlarged fragmentary, broken perspective view of an area of Fig. 1;

Fig. 9 is a fragmentary sectional view along the line 9—9 in Fig. 1; and

Fig. 10 is a schematic of the hydraulic pump unit for the hoist assembly of this invention.

Figure 1:
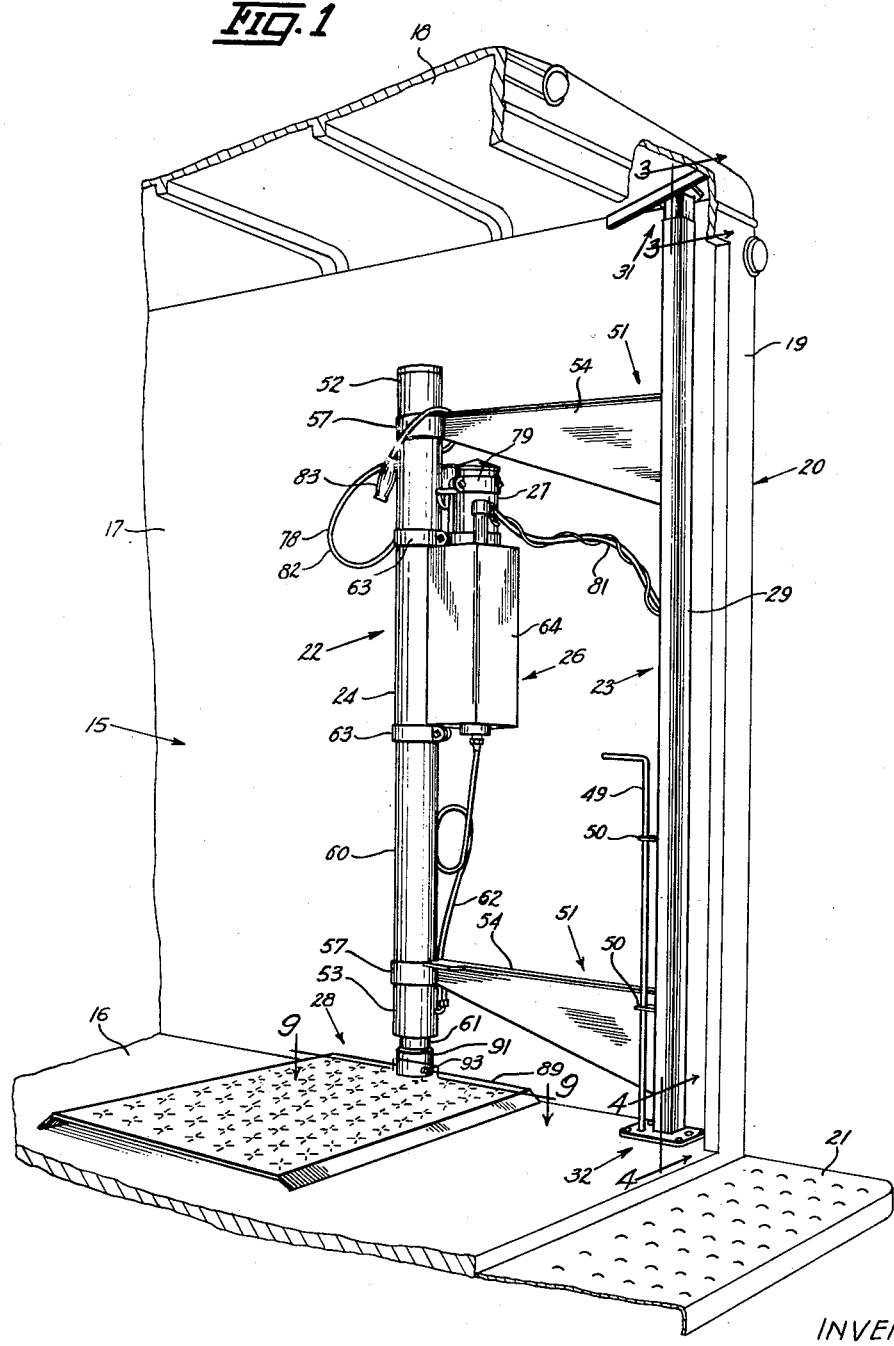
Fig. 1 is a fragmentary perspective of the rear of an open van or truck box wherein is assembled an embodiment of the hoist assembly of this invention.

Referring to the drawings, particularly to Fig. 1, the open end of a body or box 15 of a truck or moving van is shown, the box including a floor 16, a side wall 17, a ceiling 18, and a rear corner post 19. A rear deck 21 is also shown. For the purpose of this invention the truck box 15 is categorized as an elevated structure.

The hoist assembly of this invention, indicated generally at 22, is mounted within the truck box 15 adjacent the side wall 17 and includes a vertically disposed supporting unit 23, adapted to be pivotally moved in a horizontal manner, a vertically disposed piston and cylinder unit 24 secured to the supporting unit 23 for movement therewith, a pump unit 26 and a motor 27 both of which are secured to the cylinder unit 24, and a platform unit 28 mounted at the lower end of the cylinder unit 24 in a horizontally disposed manner, and adapted to move horizontally and vertically.

The supporting unit 23 includes an elongated supporting post 29 mounted closely adjacent the side wall 17 and the rear corner post 19 by top and bottom bearing structures, 31 and 32 respectively, which are respectively secured to the ceiling 18 and the floor 16 of the truck box 15.

The top bearing structure 31, best shown in Figs. 3 and 5, includes a female part 33 in block form which is securely fitted into the top of the supporting post 29. A hole 34 is formed in the female part 33 for the reception of a circular male plug 36 which is integral with a plate 37. The plate 37 is adapted to be connected to a relatively flat triangular plate 38, as by cap screws 39, the plate 38 in turn being secured, as by cap screws 40 to the box ceiling 18.

The bottom bearing structure 32 for the supporting post 29, best shown in Figs. 4 and 6, includes a female part 41 in block form having a hole 42 for the reception of a circular male plug 43 mounted on a relatively flat plate 44. Cap screws 46 are utilized to secure the plate 44 to the floor 16 of the box 20. A pair of arcuately spaced holes 47 (Fig. 8) are formed in the plate 44 for the purpose of selectively receiving the lower end 48 of a vertically disposed latch rod 49 which is held in spaced relation to the supporting post 29, by a pair of vertically spaced brackets 50.

A pair of supporting members 51 (Figs. 1 and 2) are secured to the supporting post 29 in a vertically spaced relation, and are adapted to hold the cylinder unit 24 in a vertically disposed manner as by clamping the unit 24 at the upper and lower ends 52 and 53 thereof, respectively. Each supporting member 51 (Fig. 7) comprises a relatively flat, triangular shaped main portion 54 secured at one end to the post 29, as by welding. A pair of arcuately formed flanges 57 extend from the other end of the portion 54 and encircle the unit 24. A lip 58 is formed at the free end of each flange 57, and by the means of a connecting device 59, the lips 58 and thus the flanges 57 are secured about unit 24.

The cylinder unit 24 is a conventional one-way hydraulic unit comprising an elongated cylinder 60 and a piston rod 61 (the piston head not being shown) adapted for reciprocal movement within and externally of the cylinder 60. A fluid line 62 leads from the lower end of the cylinder 60 to the pump unit 26.

The pump unit 26 (Figs. 1 and 10) comprises a rectangular reservoir housing 64 secured to the cylinder 60, as by brackets 63. A pair of continually meshed gears 65, one of which is driven by the motor 27, are drivably mounted within the reservoir 64 for withdrawing fluid therefrom through a passage 66 and into a gear chamber 67. The fluid is forced through another passage 68 to a normally closed spring valve 69 from whence the fluid may flow to the fluid line 62 leading to the lower end 53 of the cylinder 60. A normally closed bypass valve 72 is provided for permitting fluid to flow from either the reservoir 64 or the positive pressure side of the cylinder unit 24 through passages 71 and 73 back into the reservoir 64.

The bypass valve 72 is held in a normal position closing the bypass passage 73 from the main line 62, by a spring 70. A rod 74 is connected to the valve 72 at one end and at the other end is connected externally of the reservoir housing 64 (Fig. 2) to a lever 76 mounted on a fulcrum 77 which is secured to the top of the housing 64. The free end of the lever 76 is secured to a pull cord 78 of a length to extend below the rear deck 21. It may be seen, thus, that by pivoting the lever 76, as by pulling the cord 78 downwardly, the force of the spring 70 is overcome, thus opening the bypass valve 72.

The motor 27 is of a conventional type and is secured atop the reservoir housing 64, as by a bracket 63. Current is supplied to the motor 27 by a battery (not shown) which may be installed underneath the floor 16, or by the truck battery. A terminal bracket 79 is secured about the motor 27 for the attachment of a conduit 81 to the battery and a conduit 82 having a control grip 83 at one end thereof for starting and stopping the motor 27. The conduit 82 and the pump unit cord 78 are of the same extended length and are joined at their free ends by the grip 83.

The platform unit 28, best shown in Figs. 1 and 9, comprises a pair of relatively flat plates 84 and 86, each having angularly depending side flanges 87 and 88, the plates and the flanges arranged in a nested relationship. The platform is horizontally disposed so as to rest upon the floor 16 of the truck box 15 with one end 89 closely adjacent the side wall 17. A circular housing 91 is secured to the platform at an inner corner thereof and receives therein the lower end 92 of the piston rod 61 for attachment, as by a pin 93.

The operation of the hoist assembly 22 is as follows: Assuming the platform 28 is in a lowered position on the floor 16 of the truck box 15, the platform is then in a position to remove freight from the truck or van to a loading platform, or to the ground as the case may be. After the freight has been placed on the platform 28, the control grip 83 is then actuated to start the motor 27.

Operation of the motor 27 will rotate the gears 65 in the direction indicated by arrows (Fig. 10) whereupon fluid will be forced through the line 62 into the cylinder 60 at a position below the piston head and thus force the piston head and the rod 61 upwardly toward the top of the cylinder 60. This action will raise the platform 28 and the freight thereon above the floor 16. The control grip 83 is then actuated to turn the motor 32 off, whereby the platform 28 remains at its last position due to the valves 69 and 72 being closed. The platform 28 and the cylinder unit 24 are then pivotally moved by manual or other means on the supporting unit 23 to a position where the platform is outside the confines of the truck box 20 and beyond the rear deck 21.

To lower the platform 28 and the freight thereon, the pull cord 78 is pulled so as to open the bypass valve 72, whereby the fluid below the piston head in the cylinder 60 is forced back through the line 62 and through the bypass valve into the reservoir 64. Under the action of gravity, the platform 28 drops slowly until it rests upon the loading platform on the ground.

To raise the platform unit 28, with or without freight thereon, the control grip 83 is actuated to start the motor 27, whereby the platform unit 28 is raised by the same method of hydraulic operation outlined hereinbefore. When the platform has been raised to a position above the level of the floor 16, it and the cylinder unit 24 are pivotally swung in a horizontal manner about the supporting unit 23 until the platform 28 is spaced directly above the floor 16. The pull cord 78 is then pulled to lower the platform onto the floor, the hydraulic system operating as described hereinbefore. Actuation of the control grip 83 will of course stop the motor operation.

It is to be noted that as the supporting unit 23 and the cylinder unit 29 are both vertically disposed and adapted to be moved to a position closely adjacent a side wall 17 of the truck box 15, and as the platform unit 28 is adapted to rest flat upon the floor 16, the entire hoist assembly 22 uses but little of the pay load space in the truck box during transportation of the moving van or truck.

Although only one embodiment of the invention has been disclosed and described herein, it is not to be so limited as various modifications and alternate constructions can be made within the full scope of the invention as defined in the appended claims.

I claim:

1. A hoist apparatus comprising supporting means having one end mounted on an elevated structure for horizontal rotational movement, an upright piston and cylinder unit rotatably carried by said supporting means in spaced relationship thereto for movement therewith and for independent rotational movement of the piston of said unit relative thereto, with said piston being extendible from the lower end of the cylinder of said unit and reciprocally movable in a vertical direction, horizontally disposed platform means secured to the lower end of said piston whereby said platform means is rotatable with said piston at all reciprocally moved positions of said piston, hydraulic means operably connected to said piston and cylinder unit, and control means for said hydraulic means.

2. For use with a moving van or the like having a box open at the rear, said box having a floor and a ceiling, a hoist assembly for loading and unloading freight into and from said box comprising, bearing structures mounted on said floor and ceiling within a rear corner of said box, upright supporting means mounted in said bearing structures for rotation in a horizontal plane, said supporting means including laterally extended arms, piston and cylinder means including a reciprocally movable piston rod a portion of which extends externally of the cylinder, means mounting said cylinder to the free ends of said arms whereby said cylinder is disposed in a vertical position for rotational movement with said supporting means and said piston rod is extendible downwardly from said cylinder, a horizontally disposed platform means secured to said piston portion for vertical movement therewith and for rotational movement relative to said cylinder, whereby said platform means is movable above and below the level of said floor and swingable to positions to the inside and outside of said box, and means for supplying and releasing fluid under pressure to said piston and cylinder means.

References Cited in the file of this patent

UNITED STATES PATENTS

| | | |
|---|---|---|
| 2,497,474 | Snow | Feb. 14, 1950 |
| 2,540,569 | Crise | Feb. 6, 1951 |
| 2,792,951 | White | May 21, 1957 |